United States Patent
Henn

Patent Number: 5,590,970
Date of Patent: Jan. 7, 1997

[54] CONTACT-FREE DOUBLE-SHEET CONTROL DEVICE FOR A PRINTER

[75] Inventor: Andreas Henn, Neckargemünd, Germany

[73] Assignee: Heidelberger Druckmaschinen AG, Heidelberg, Germany

[21] Appl. No.: 526,113

[22] Filed: Sep. 8, 1995

[30] Foreign Application Priority Data

Sep. 8, 1994 [DE] Germany .................. 44 31 934.7

[51] Int. Cl.⁶ .................................................. B41F 33/02
[52] U.S. Cl. .................................. 400/708; 101/484
[58] Field of Search .......................... 101/484, 485, 101/480, 483, 494, 481; 400/708, 708.1

[56] References Cited

FOREIGN PATENT DOCUMENTS

| | | |
|---|---|---|
| 1050555 | 2/1959 | Germany . |
| 1091349 | 10/1960 | Germany . |
| 1238492 | 4/1967 | Germany . |
| 2939739 | 4/1980 | Germany . |
| 3300320 | 9/1983 | Germany . |
| 3344842 | 10/1984 | Germany . |
| 280085 | 6/1990 | Germany . |
| 4003532 | 8/1990 | Germany . |

OTHER PUBLICATIONS

ETZ–A Publ. BD. 78, H. 14, Jul. 11, 1957, pp. 495–499, "Wirbelstromdäpfung und–bremsung mit dauermangn . . . ".

*Primary Examiner*—John S. Hilten
*Attorney, Agent, or Firm*—Herbert L. Lerner; Laurence A. Greenberg

[57] ABSTRACT

Contact-free double-sheet control device for a printing press having a capacitively-operating measuring sensor for determining sheet count, a counter-electrode adjacent thereto, and an evaluation circuit connected to the sensor, includes an eddy-current measuring sensor assigned to the capacitive measuring circuit for compensating for operating influences.

12 Claims, 5 Drawing Sheets

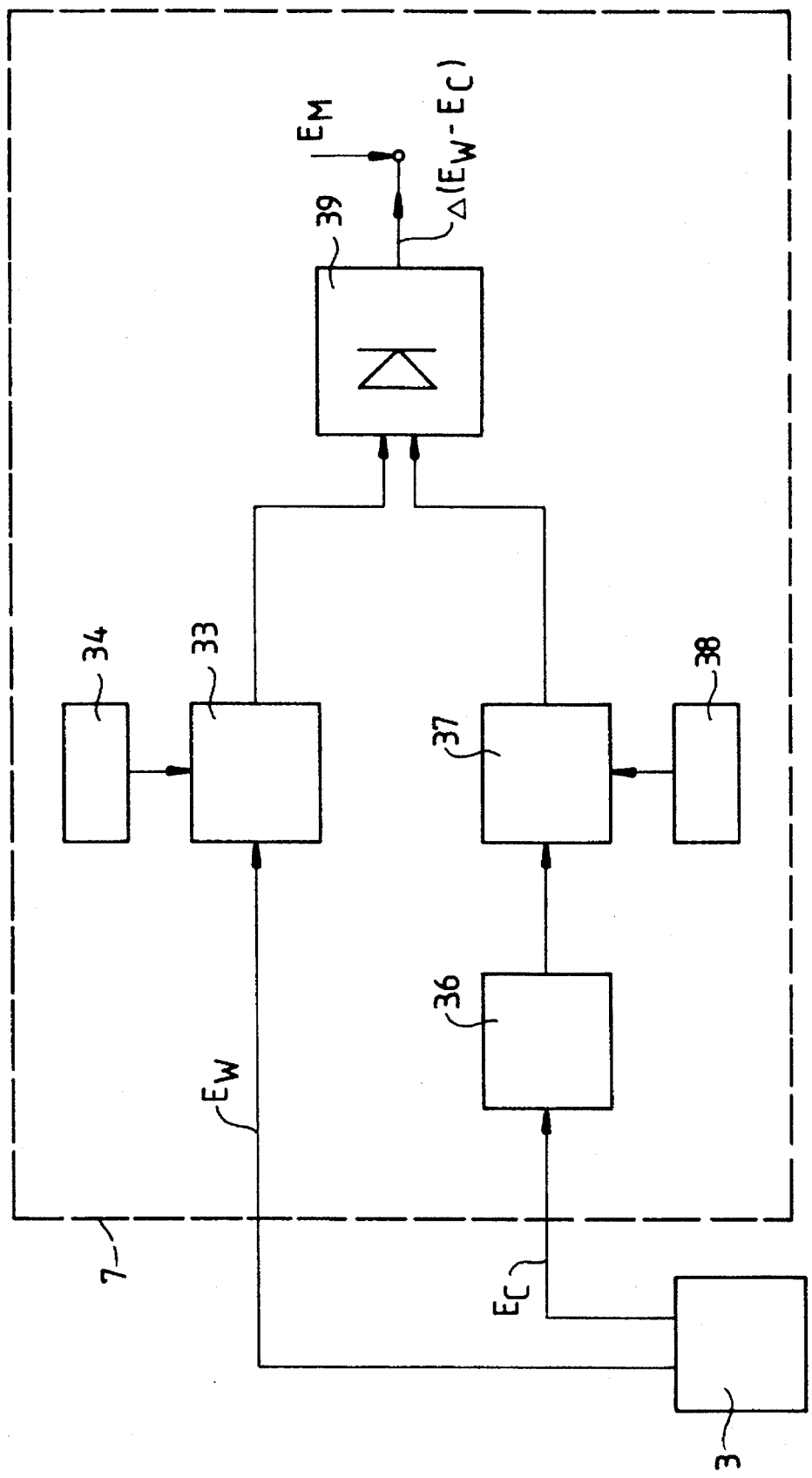

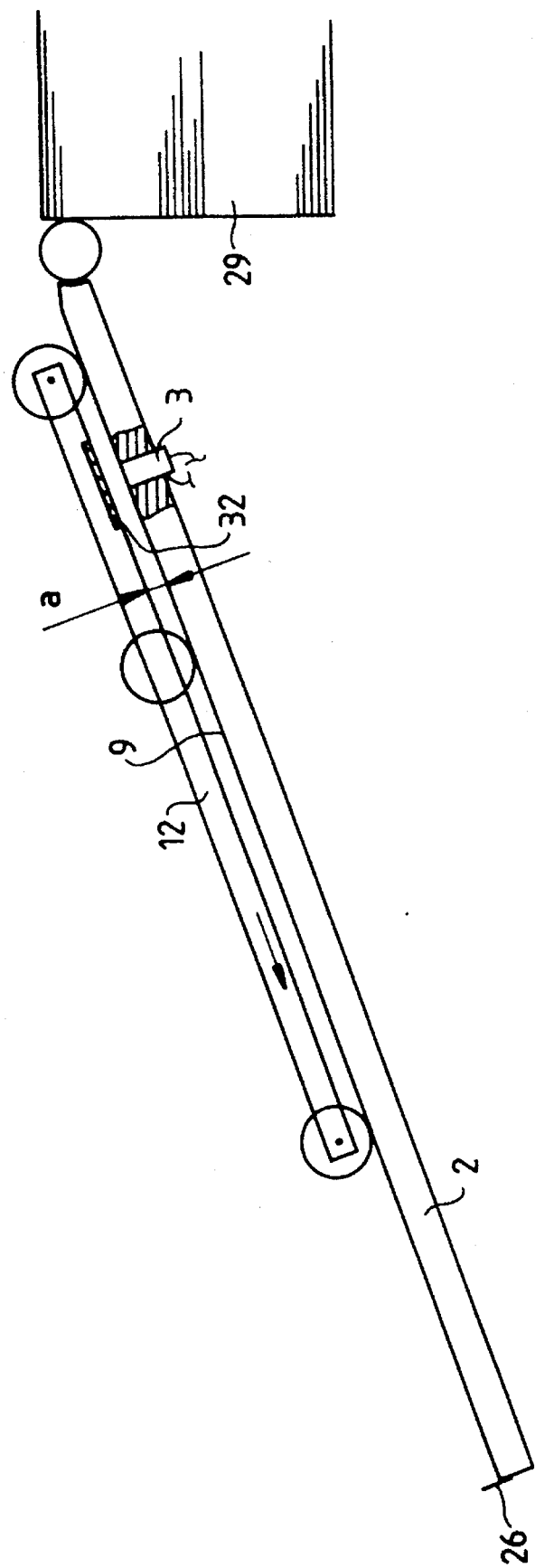

CONTACT-FREE DOUBLE-SHEET CONTROL DEVICE FOR A PRINTER

BACKGROUND OF THE INVENTION

1. Field of the Invention

The invention relates to a contact-free double-sheet control device in a printing press.

2. Description of Related Art including information disclosed under 37 CFR 1.97–1.99

A double-sheet control device which operates contact-free has become known heretofore in German Published Non-prosecuted Patent Application (DE-OS) 33 44 842. This heretofore known device has two serially connected plate-like precision capacitors which are connected to one another by a bridge circuit. The precision capacitors are fastened onto a common carrier plate to compensate for operating influences, such as machine vibrations, for example, the opposing plates of the capacitors being formed by a conveyor table.

The respective serially-connected precision capacitors of the foregoing published German application, however, are only able to measure the thickness of the sheets. Consequently, a measurement is attainable only at an overlap border of two consecutive sheets. Furthermore, the spacing between two overlap borders must correspond to at least the capacitor length.

SUMMARY OF THE INVENTION

It is accordingly an object of the invention to provide an improved contact-free sheet control device for printing presses for measuring mis-fed sheets, which prevents interruptions in production runs by recognizing faulty or erroneous double sheets.

With the foregoing and other objects in view, there is provided, in accordance with the invention, a contact-free double-sheet control device for a printing press having a capacitively-operating measuring sensor for determining sheet count, a counter-electrode adjacent thereto, and an evaluation circuit connected to the sensor, comprising an eddy-current measuring sensor assigned to the capacitive measuring circuit for compensating for operating influences.

In accordance with another feature of the invention, the counter-electrode is a feeding table of a printing press.

In accordance with a further feature of the invention, the counter-electrode is disposed above a feeding table of a printing press.

In accordance with an added feature of the invention, the counter-electrode is a sheet smoother.

In accordance with an additional feature of the invention, the capacitive measuring sensor and the eddy-current measuring sensor are disposed opposite one another in a spacing.

In accordance with yet another feature of the invention, the capacitive measuring sensor and the eddy-current measuring sensor are assembled into a combisensor.

In accordance with yet a further feature of the invention, the combisensor is disposed freely in the vicinity of a feeding table of a printing press.

In accordance with yet an added feature of the invention, the control device includes a traverse on which the combisensor is disposed.

In accordance with yet an additional feature of the invention, the traverse is disposed at an end of the feeding table facing towards a sheet pile.

In accordance with still another feature of the invention, the capacitively-operating measuring sensor and the eddy-current measuring sensor coaxially within one another.

In accordance with still a further feature of the invention, the combisensor has one of an elliptical, a triangular, a polygonal and a circular cross section.

In accordance with a concomitant feature of the invention, an electric signal of the capacitive measuring sensor and a measuring signal of the eddy-current measuring sensor are combinable by subtraction by means of the evaluation circuit.

The measuring device of the invention occupies a relatively small structural space and is installable freely in a region of the feeding table which forms the counter-electrode. Due to this construction, the measuring device can be disposed at a relatively great distance or spacing from the front lays, so that adequate time remains for switching off the press when a mis-printed or faulty sheet is recognized or detected, even at relatively high press speeds.

Due to the free selection of the type of arrangement, a changeover or conversion as well as a retrofitting or upgrading, respectively, is always readily possible.

The measuring device may also be integrated in and cooperate with a counter-electrode spaced from the conveyor or feeding table and disposed above the measuring device. The measuring device or the counter-electrode can thereby be fastened to an overlay rake or sheet smoother cooperating with the feeding table. It is also possible for the counter-electrode to be formed by the sheet smoother.

In an advantageous manner, the sensors of the measuring device are disposed coaxially within one another, due to which they are applied to virtually the same, relatively small measurement location. Disruptive mechanical effects, such as tilting or tipping movements of the measuring device, are thereby minimized.

Other features which are considered as characteristic for the invention are set forth in the appended claims.

Although the invention is illustrated and described herein as embodied in a contact-free double-sheet control device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

BRIEF DESCRIPTION OF THE DRAWINGS

FIG. 4 is a schematic circuit diagram of an evaluating circuit for the combisensor of FIGS. 1 and 2; and FIG. 5 is a view like that of FIG. 1 of the feeding table with a different embodiment of the conbisensor.

DESCRIPTION OF THE PREFERRED EMBODIMENTS

Figure 1:
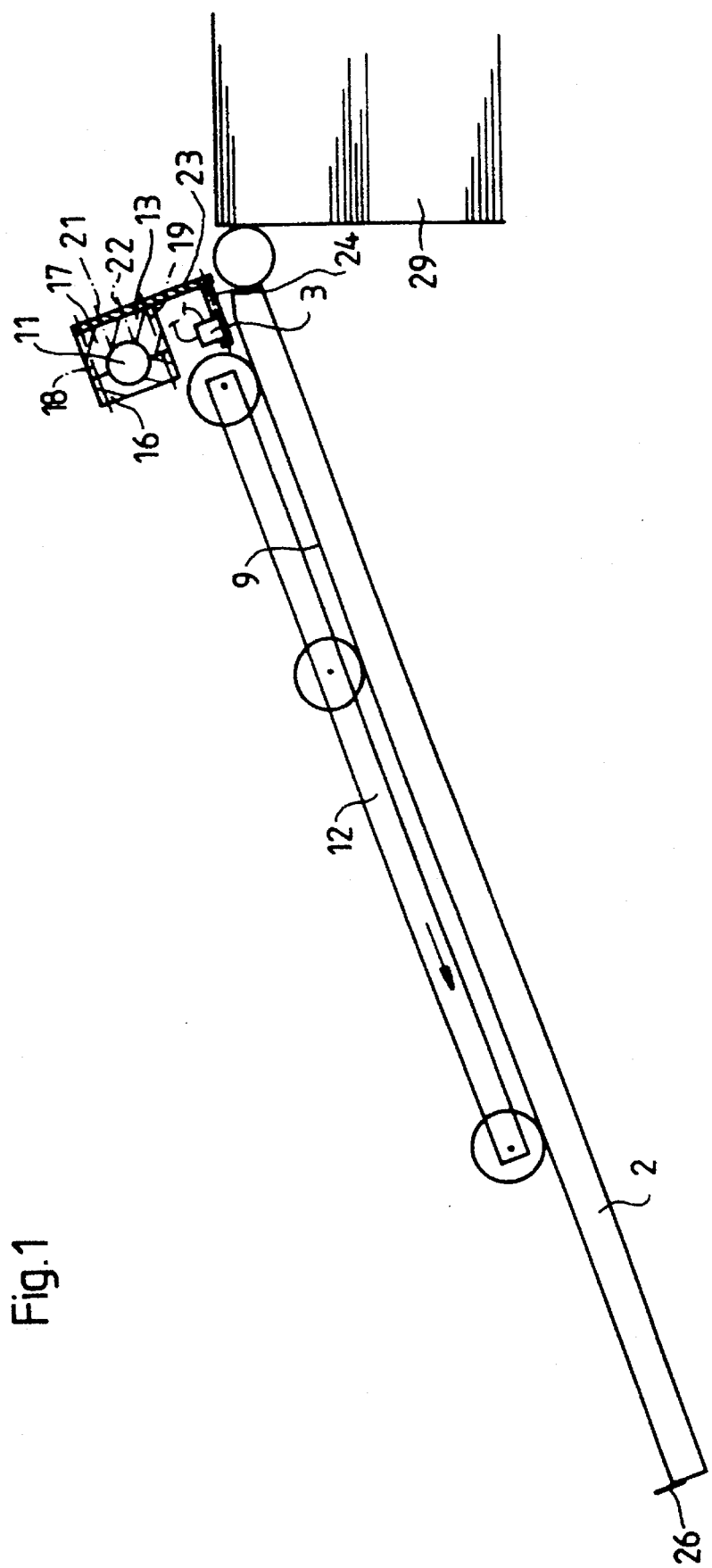
FIG. 1 is a diagrammatic side elevational view of a feeding table of a printing press.
Figure 2:
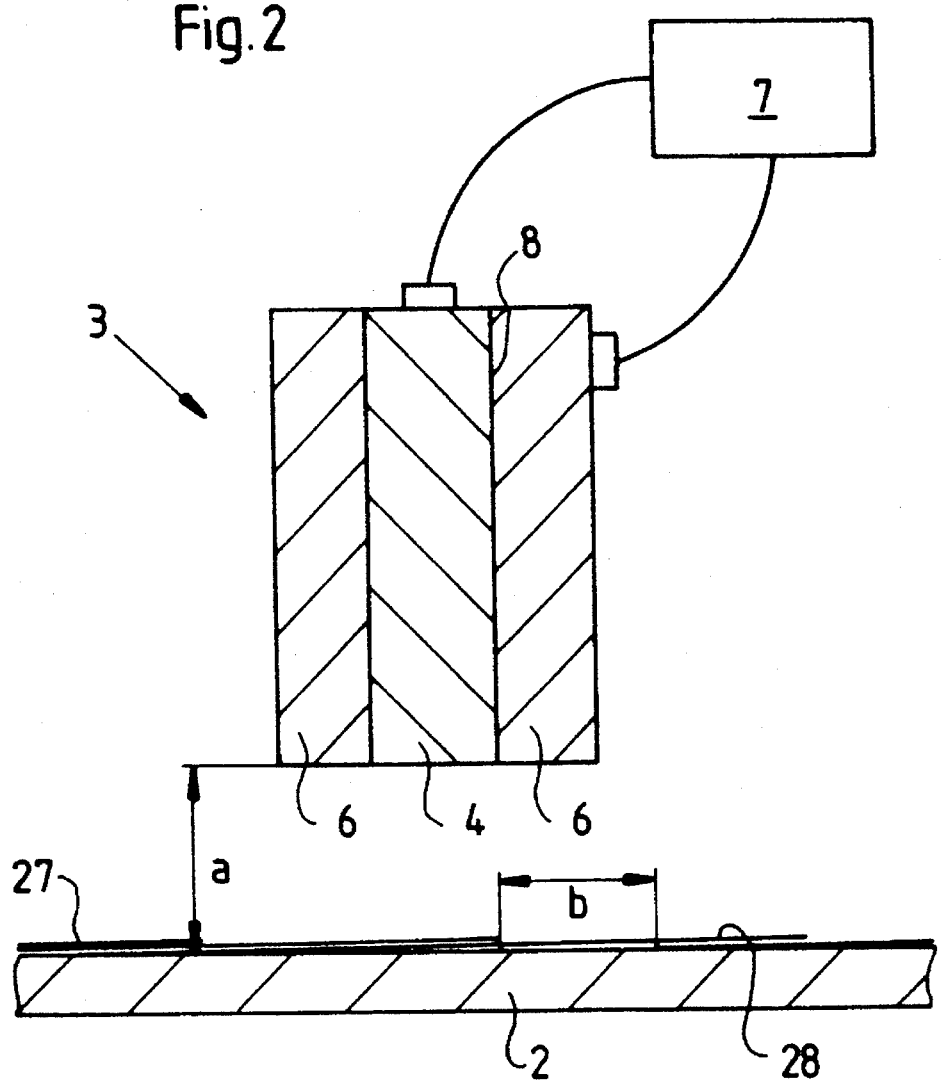
FIG. 2 is a much-enlarged fragmentary cross-sectional view of FIG. 1 showing diagrammatically an embodiment of a so-called combisensor forming part of the control device according to the invention.

Referring now to the drawings and particularly to FIG. 1 thereof, there is shown therein, on a sheet feeder 1 of a printing press and in the vicinity of a feeding table 2 thereof, a so-called combisensor 3 for detecting, without contact, mis-fed sheets, such as double sheets, for example. The combisensor 3 is formed of a capacitive measuring sensor 4 and an eddy-current measuring sensor 6. The sensors 4 and 6 are connected via electric lines to an evaluation 7 (note FIG. 2). In the embodiment shown in greater detail in FIG. 2, the capacitive measuring sensor 4 is surrounded coaxially by the eddy-current sensor 6, insulation 8 being provided at the common contact surfaces thereof. The combisensor 3 is arranged so as to be slidable and swivelable on a traverse or crosstie rod 11 at a spaced distance a, approximately equal to from two to ten mm from an upper side 9 of the feeding table 2. The traverse 11 is supported in side frames of the sheet feeder 1. It is also possible to fasten the combisensor 3, for example, to an overlay guide or sheet smoother 12. A bipartite bracket 13 surrounds and is secured to the traverse 11. The two parts 16 and 17 of the bracket 13 are held together by fastening screws or setscrews 18 and 19 and clamped to the traverse 11. By means of two additional fastening screws 21 and 22, a supporting beam 23 is fastened to the part 17 of the bracket 13 which, as viewed from the traverse 11, extends in a direction towards the feeding table 2. At the end of the beam 23 facing towards the feeding table 2, a holder 24 for carrying the combisensor 3 is provided. The combisensor 3 has a large spacing b in sheet transport direction, which is represented by the associated arrow in FIG. 1, towards front lays 26 which are located in the immediate vicinity of the cylinders of the printing press, the distance b being greater than a sheet overlap length, as shown in FIG. 2. The combisensor 3 is preferably disposed on an end of the feeding table 2 facing towards a sheet pile 29.

In the the embodiment according to FIG. 2, the combisensor 3 is formed as a coaxial bearing of two cylindrical bodies 4 and 6, with a circular cross-sectional surface area resulting therefrom. It is also possible, however, to provide elliptical, triangular or polygonal cross-sectional surface areas. The possibility furthermore exists of arranging the capacitive measuring sensor 4 and the eddy-current measuring sensor 6 adjacent to one another, preferably directly near one another, i.e., separated only by the insulation 8.

The capacitive measuring sensor 4 detects or measures a total thickness of a sheet stream 27 acting as a dielectric, which is fed through the spacing a between the capacitive sensor 4 and the feeding table 2. The sheet stream 27 can have a plurality of single sheets 28, such as five, for example, depending upon the overlap length. In accordance with the total thickness of the sheet stream 27, an electric signal Ec is generated and passed on to the evaluation circuit 7. Even with only one sheet 28, an electric signal Ec is generated which is sufficient for reliably displaying or indicating the thickness of the individual sheet 28. By means of the double-sheet control device according to the invention, it is therefore possible to provide an effective monitoring even starting from the sheet in-feed. Mechanical disturbances, such as vibrations, for example, occur due to the machine run. The combisensor 3 accordingly performs a a movement relative to the feeding table 2. The electric signal Ec generated by the capacitive sensor 4 can have such great fluctuations that an error message may result which can shut the press operation down. For this reason, the eddy-current measuring sensor 6 has been assigned to the capacitive measuring sensor 4, and continuously generates an electric signal Ew corresponding to the spacing a, which is also transmitted to the evaluation circuit 7. The electric signals Ec and Ew are combined thereat by subtraction. An advantage derived from the eddy-current measuring sensor 6 is that it is not dependent upon the total thickness of the sheet stream 27, but rather, only upon the actual spacing a between the combisensor 3 and the counter-electrode, such as the feeding table 2, for example. It is thereby of outstanding value for compensating for spacing variations.

Figure 3:
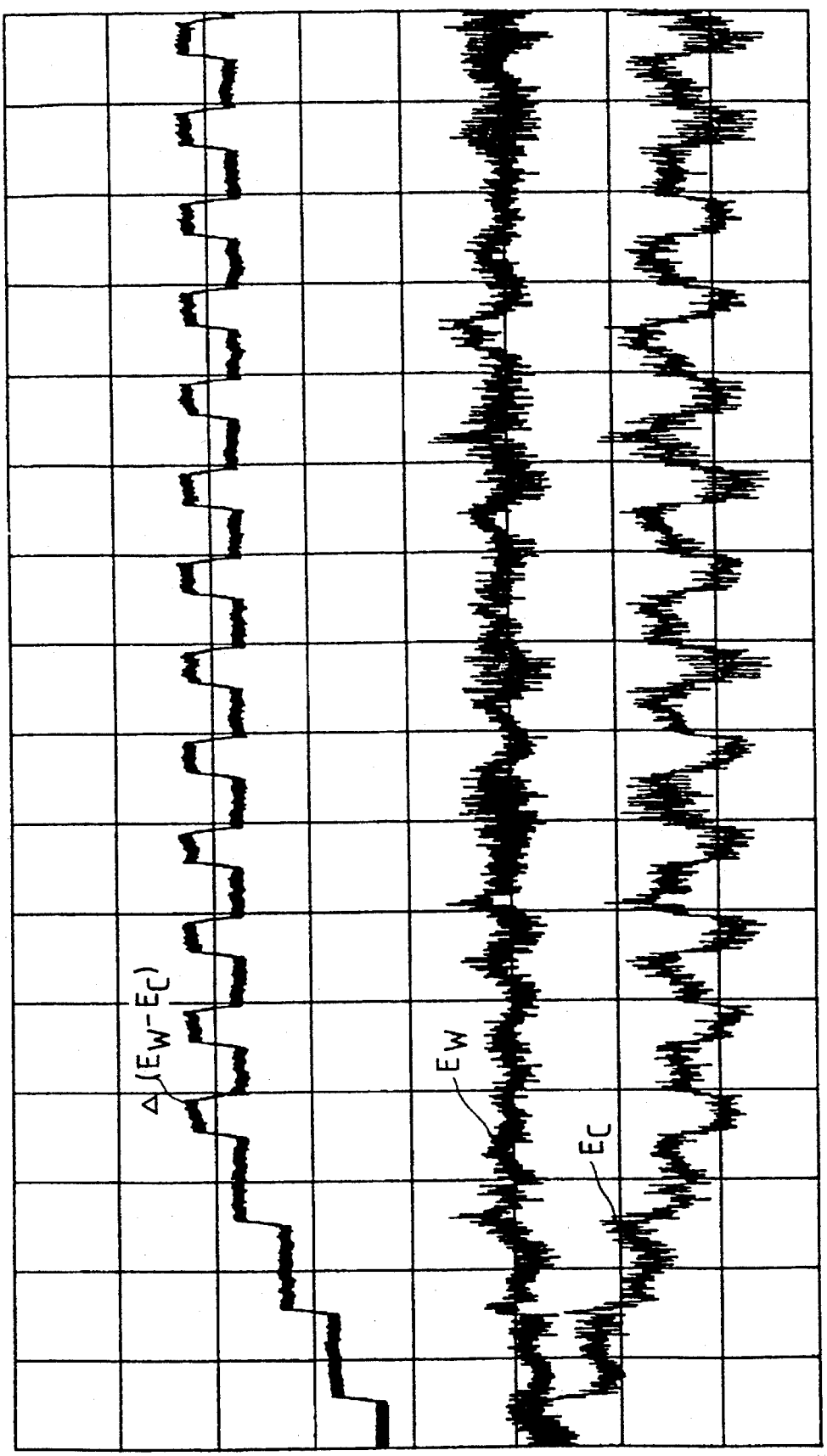
FIG. 3 is a plot diagram from top to bottom of a measurement signal variation or pattern from a capacitive measuring sensor, from an eddy-current measuring sensor, and from the combination of both of the foregoing measuring sensors as a function of the angular position of the printing press during sheet in-feed.

FIG. 3 shows qualitatively the course or variations of the electric signals Ew and Ec and the combination Ew-Ec thereof.

In the vicinity of the phase angle 0° of the printing press, only one single sheet 28 is measured. The signal Ec has sharp variations in this region and would result in a mis-fed sheet message without compensation by the signal Ew. The compensated signal Ew-Ec is clear and accurate, in contrast. A further electric signal $E_M$ is generated in accordance with or as a function of the angular setting of the cylinders of the printing press, i.e., the press cycle, and likewise fed to the evaluation circuit 7. By means of the combination of the signals Ew, Ec and $E_M$, the evaluation circuit 7 recognizes how many single sheets 28 and how thick the sheet stream 27, respectively, should measure for a given angle setting of the cylinders of the press in order that no mis-fed sheets be present. A deviation of about a factor d, which is equal to 1.8 times the sheet thickness, from the recognized value results in a signal "mis-fed sheet" and a shutdown of the press and sheet transport circuits, respectively connected therewith.

In a second embodiment of the control device according to the invention shown in FIG. 5, the combisensor 3 is integrated with the feeding table 2. A metal plate 32 is disposed as a counter-electrode above the feeding table 2. In this regard, it is also possible that the sheet smoother 12 is formed as the counter-electrode. FIG. 4 is a block circuit diagram of the evaluation circuit 7. The combisensor 3 delivers the electric signals Ew and Ec to the evaluation circuit 7. The electric signal Ew of the eddy-current measuring sensor 6 is fed to a demodulator 33, which simultaneously receives a signal from an oscillator 34. A signal resulting therefrom is then fed to an analog computer 39. The electric signal Ec of the capacitive measuring sensor 4 is amplified by a pre-amplifier 36 and transmitted to a second demodulator 37 and subjected thereat to a signal from a second oscillator 38. A signal resulting therefrom is likewise fed to the analog computer 39 which combines by subtraction the signals generated by the demodulators 33 and 38 and produces a measurement signal Ew-Ec. This is thereafter combined with the electric signal $E_M$. In a further, non-illustrated embodiment of the invention, the capacitive measuring sensor 4 is disposed opposite the eddy-current measuring sensor 6 in the spacing a. In this regard, both the capacitive measuring sensor 4 and the eddy-current measuring sensor 6 can be disposed in the feeding table 2 and respectively located opposite one another, preferably on a common axis.

I claim:

1. Contact-free double-sheet control device for a printing press, comprising a capacitively-operating measuring sensor for determining a sheet count of the printing press, a counter-electrode adjacent to said capacitively-operating measuring sensor, an evaluation circuit connected to the sensor, and an eddy-current measuring sensor connected to the capacitive measuring circuit, said eddy-current measuring sensor compensating for operating influences.

2. Control device according to claim 1, wherein the counter-electrode is a feeding table of a printing press.

3. Control device according to claim 1, wherein the counter-electrode is disposed above a feeding table of a printing press.

4. Control device according to claim 1, wherein the counter-electrode is a sheet smoother.

5. Control device according to claim 1, wherein the capacitive measuring sensor and said eddy-current measuring sensor are disposed opposite one another in a spacing.

6. Control device according to claim 1, wherein the capacitive measuring sensor and said eddy-current measuring sensor are assembled into a combisensor.

7. Control device according to claim 6, wherein said combisensor is disposed freely in the vicinity of a feeding table of a printing press.

8. Control device according to claim 7, including a traverse on which said combisensor is disposed.

9. Control device according to claim 8, wherein said traverse is disposed at an end of the feeding table facing towards a sheet pile.

10. Control device according to claim 1, wherein the capacitively-operating measuring sensor and said eddy-current measuring sensor are mounted coaxially within one another.

11. Control device according to claim 6, wherein said combisensor has one of an elliptical, a triangular, a polygonal and a circular cross section.

12. Control device according to claim 1, wherein an electric signal of the capacitive measuring sensor and a measuring signal of said eddy-current measuring sensor are combinable by subtraction by means of said evaluation circuit.

* * * * *